United States Patent
Eriksson et al.

(10) Patent No.: US 8,092,342 B2
(45) Date of Patent: Jan. 10, 2012

(54) METHOD FOR ADAPTING AN AUTOMATED TRANSMISSION OF A HEAVY VEHICLE IN CONSIDERATION OF A SPEED SENSITIVE PTO

(75) Inventors: Anders Eriksson, Torslanda (SE); Sixten Berglund, Torslanda (SE); Peter Templin, Västra Frölunda (SE); Lars Karlsson, Göteborg (SE); Erika Jakobsson, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 820 days.

(21) Appl. No.: 12/066,315

(22) PCT Filed: Sep. 8, 2006

(86) PCT No.: PCT/SE2006/001038
§ 371 (c)(1),
(2), (4) Date: Aug. 12, 2008

(87) PCT Pub. No.: WO2007/030072
PCT Pub. Date: Mar. 15, 2007

(65) Prior Publication Data
US 2009/0221399 A1 Sep. 3, 2009

Related U.S. Application Data

(60) Provisional application No. 60/596,218, filed on Sep. 8, 2005.

(51) Int. Cl.
*B60W 10/04* (2006.01)
(52) U.S. Cl. .......................................... 477/115
(58) Field of Classification Search ............... 477/110, 477/111, 115, 125, 97; 74/15.66, 15.4; 180/53.1
See application file for complete search history.

(56) References Cited

U.S. PATENT DOCUMENTS

| | | | |
|---|---|---|---|
| 5,740,044 A | 4/1998 | Ehrenhardt et al. | |
| 5,971,888 A | 10/1999 | Goode | |
| 6,546,705 B2 * | 4/2003 | Scarlett et al. | 56/10.2 R |
| 6,942,595 B2 * | 9/2005 | Hrazdera | 477/37 |
| 7,399,255 B1 * | 7/2008 | Johnson et al. | 477/42 |
| 2002/0010534 A1 * | 1/2002 | Goodnight et al. | 701/54 |
| 2006/0128524 A1 * | 6/2006 | Busch | 477/110 |
| 2006/0252597 A1 * | 11/2006 | Williams | 477/107 |

FOREIGN PATENT DOCUMENTS

EP 1130292 A 9/2001

(Continued)

OTHER PUBLICATIONS

International Search Report for corresponding International Application PCT/SE2006/001038.

(Continued)

*Primary Examiner* — Roger Pang
(74) *Attorney, Agent, or Firm* — WRB-IP LLP

(57) ABSTRACT

Method for adapting an automated transmission of a heavy vehicle in consideration of a speed sensitive PTO. The method selects appropriate gears based on the constraint that the engaged PTO should remain below a set speed limit. The information about the speed limit of the PTO is used by the transmission control unit to ensure that the engine does not drive the PTO at a speed higher than the given speed limit. The engine speed may also be limited to reduce the engine speed to prevent it from exceeding the allowable PTO speed.

10 Claims, 3 Drawing Sheets

FOREIGN PATENT DOCUMENTS

| | | |
|---|---|---|
| GB | 2370326 A | 6/2002 |
| WO | WO2005021313 A | 3/2005 |
| WO | WO2005058629 A | 6/2005 |
| WO | 2009090550 A | 7/2009 |

OTHER PUBLICATIONS

European Search Report for corresponding application EP 06 78 4168.

* cited by examiner

METHOD FOR ADAPTING AN AUTOMATED TRANSMISSION OF A HEAVY VEHICLE IN CONSIDERATION OF A SPEED SENSITIVE PTO

The present application claims the benefit of U.S. Provisional Application No. 60/596,218 filed Sep. 8, 2005. Said application is expressly incorporated herein by reference in its entirety.

BACKGROUND AND SUMMARY

The present invention relates to adapting an automated transmission of a heavy commercial vehicle in view of the active state of an associated power take off unit that should not be driven at a speed exceeding a certain specified and safe limit.

Heavy commercial vehicles such as overland trucks and buses are known to employ automatic mechanical transmissions that are based on preprogrammed routines. Automatic mechanical transmissions of the stage-geared gearbox type have become increasingly common in heavy-duty vehicles as microcomputer technology has continued to advance. These computer-based advancements have made it possible, with a control computer and a number of control elements, for example servo motors, to precision-control the engine speed, the connection and disconnection of an automated clutch between the engine and gearbox, and between coupling members of the gearbox relative to one another, so that smooth gearshifts are always obtained at correct engine speeds.

The advantage of this type of automatic gearbox, compared to a traditional automatic gearbox constructed with planetary gear steps and having a hydrodynamic torque converter on the input side, is two-fold. In a first aspect, and particularly with regard to use in heavy vehicles, the electronic based AMT system is more simple and robust, and can be produced at substantially lower cost than traditional automated gearboxes. In a second aspect, the electronic based AMT system enables the vehicle to be more efficient with respect to fuel consumption.

One of the problems in controlling an AMT, however, is attributable to the power consumption imposed by an associated power take off (PTO). A PTO can generally be classified as a PTO upstream or downstream of the master clutch. In general, a PTO that is upstream of the master clutch can take power from the vehicle's engine regardless of the state of engagement and activity of the vehicle's transmission via the master clutch. In contrast, a PTO that is located downstream of the master clutch is typically used only when the vehicle is stationary. Typically, a downstream PTO often involves placing the gearbox in neutral so that the vehicle wheels are not drivingly engaged to the transmission. However, there are cases when a downstream, transmission mounted PTO is used while the vehicle is in motion.

PTOs are known to impose significant load on the vehicle's engine. Exemplary PTOs use engine power to drive hydraulic pumps that can be activated for such things as mixing applications (concrete trucks) or causing motion of a bed on the truck such as in the case of dump trucks and flat-bed haulers. Similarly, PTOs may be used to power spreaders such as those used to broadcast salt or sand on icy roads, or to power associated trailer components such as compartment refrigeration units. While these examples are not exhaustive, they do serve to exemplify PTO loads of significant magnitude which can appreciably compromise the driving power available from the engine of the vehicle for the drive wheels, and which often causes undesirable disturbances to automated transmission programs that do not take their intermittent influences into account. For purposes of comparison, these significant PTO loads can be compared to less influential engine loads imposed by such power consumers as cooling fans and air conditioning compressors. As an example of the potential drag that a PTO can impose on the vehicle's engine, it is not uncommon for PTOs to siphon off engine torque on the order of 5 to 3000 Nm. An example of a PTO that requires on the order of 3000 Nm is a fire truck that operates a water pump, and an example of a PTO that requires on the order of 5 Nm would correspond to a PTO for powering a small refrigeration device.

Also, a PTO can be limited in its ability to handle excessive engine speeds. An example of this might be that of a cement mixer where the PTO is limited to 1500 rotations per minute (rpm). Other known PTOs have speed limits between 1300 and 2000 rpm. The danger of exceeding the speed limit of the PTO is that it can lead to equipment failure, which could have significant safety risks associated therewith, besides damaging the equipment. In order to prevent this problem from occurring, the engine speed, while the PTO is engaged, should remain below a corresponding limit. Typical maximum operating conditions for a diesel engine exist at or around 2100 rpm. In certain circumstances, however, diesel engines can approach speeds on the order of 2400 rpm. These circumstances are usually only allowed for short periods such as during engine braking, for example. Other engines may have speed limits higher than that of a diesel engine and could be on the order of 5000 rpm. The referenced engine may serve as an example of a more general prime mover of the vehicle, a term which encompasses any power plant that provides power to the driveline of the vehicle or other power consuming components of the vehicle. Examples of such prime movers are diesel engines, electric motors, and hybrid power systems.

The present invention appreciates the fact that current transmission control routines typically do not take into consideration engine speeds which might cause damage to speed sensitive PTO loads. If the PTO becomes at risk of failure above a certain speed and the transmission control unit allows the engine to increase speed above that point, serious damage is possible to the directly engine connected PTO. This situation can occur where the transmission control unit requests a shift that requires the engine speed to exceed the rated speed of the PTO.

Still further, it has been appreciated that it can be difficult to adjust a transmission when the limits of an associated PTO are about to be exceeded. Therefore, one aspect of the present invention has as a goal to provide a solution where no shift or other transmission function is made that requires the engine to exceed the speed allowed by the PTO when engaged. Such a function is particularly important when it is appreciated that the power-drag of the PTO often causes the vehicle to operate in lower gears (higher gear ratios) with correspondingly higher engine speeds which can damage the PTO if not controlled.

In at least one embodiment, the present invention takes the form of a method for limiting the engine speed to below a maximum allowable PTO operating speed. The method comprises (includes, but is not necessarily limited to) using a speed limited PTO to set a maximum allowable engine speed. Before processing a gear change, the transmission control unit ensures that the corresponding engine speed never exceeds the specified PTO maximum speed. If the PTO is disengaged, then the transmission control unit will allow shifting without regard to the limited PTO speed. Thus, the invention is active when there is a PTO engaged and that the PTO has a speed limit.

The speed limitations are entered into the transmission control unit or another control unit including, but not limited to those described below and stored for a given PTO. It is contemplated that the stored limit(s) can be changed, and that the transmission control unit will sense (or receive information regarding) when the PTO is engaged. Alternatively, the information might be stored in one control unit and communicated to the other control unit. The vehicle control unit might store the value of the PTO speed limit, and when a shift request is made, a request to determine that limit is made by the transmission controller and the vehicle control sends the appropriate signal to the transmission controller.

Additionally, the engine speed is also controlled through the transmission control unit to ensure that the engine speed does not exceed the PTO speed limit. This may be used in combination with the transmission gear shifting limits, or standing alone.

BRIEF DESCRIPTION OF THE DRAWINGS

The accompanying drawings variously illustrate aspects of the presently disclosed inventions. It should be appreciated that the illustrated embodiments are exemplary only, and do not serve as limitations to the protection. The drawings do, however, constitute part of the disclosure of the specification, and thereby contribute to, and provide support for the patented invention(s). In the figures.

DETAILED DESCRIPTION

The invention relates to modification of the shifting routines of an AMT when it is detected that a speed sensitive (limited) PTO is engaged in order to prevent over-speeding the PTO. Therefore a goal of the present invention is to control engine speeds using AMT gear shifting and gear selection to maintain the PTO's operational speed below its maximum allowable operating speed limit. Gear shifting describes the action of engagement/disengagement of the mechanical elements of the transmission when transitioning between different gear ratios. For example, gear shifting is the process of actually moving the mechanical parts of the transmission in the proper order to engage or disengage a gear or otherwise manipulate the transmission in response to a given request or instruction. Gear selection is the process of selecting the desired gear or the decision to maintain the current gear state. Furthermore, gear selection can consider various parameters in order to determine the proper gear selection. In an automated transmission, transmission control is carried out by having a gear selection strategy used to determine what the gear should be, then implementing a gear shifting strategy that actually carries out the requested shift in the transmission.

Many methods can be used to communicate the maximum allowable PTO speed to an appropriate control unit. In at least one exemplary embodiment, a communication link is established between the PTO and the control unit, and speed limiting instructions are communicated thereacross. The PTO speed limit can remain resident in the control unit, and upon PTO engagement, that limit is utilized for establishing the maximum allowable engine speed which is dependent upon which gear ratio is being used. Other methods exist for transferring the information to the control unit and are considered equally operable for this invention.

Figure 1:
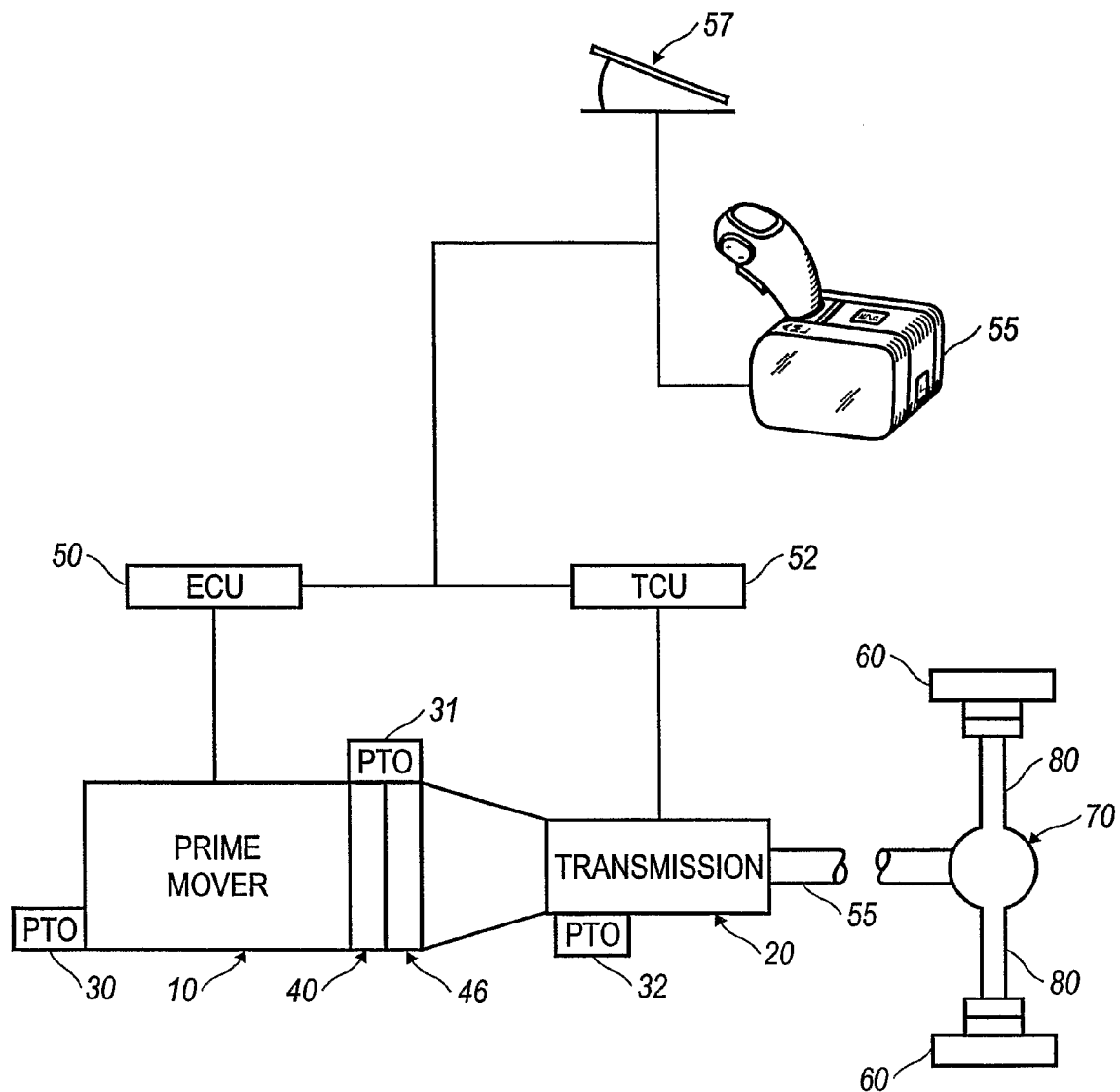
FIG. 1 is a schematic illustration of components of the automatic mechanical transmission control system.

The control unit as described above can be one of the control units on a vehicle that incorporates an automatic mechanical transmission. As shown in FIG. 1, in this exemplary embodiment, a transmission control unit 52 is utilized in order to control parameters related to the transmission 20 and optionally control certain predetermined engine characteristics or override excessive driver requests to the engine control unit 50. The engine control unit 50, while normally operating to control the engine 10 or prime mover 10, may also implement certain features related to the transmission 20 or communicate these requests to the transmission control unit 52. As will be readily understood by persons skilled in these arts, a vehicle control unit (not shown) can be utilized in addition to, or instead of the engine and transmission control units 50, 52. The transmission control unit 52 may comprise two separate control units, a gear shifting control unit and a gear selection control unit, or have separate programming for these two units in addition to other controls. The control units are capable of receiving signals from the accelerator pedal 57 and gear lever 55. The accelerator pedal 57 and gear lever 55 allow the driver to indicate a desired amount of power or speed and make the appropriate selection of the mode of operation of the automatic mechanical transmission. While specific examples of control units can be used to describe different features, the control function may be handled by one or more of the above described control units or variations thereof. The transmission 20 as shown in FIG. 1, is further connected to drive shaft 55 which is in turn connected the drive axle 80 via a differential gear 70. The drive axle 80 provides power to the drive wheels 60 which propel the vehicle.

As shown in FIG. 1, the PTO can be mounted in various locations on the powertrain. An engine mounted PTO 30 is attached directly to the engine 10 or prime mover 10 and is upstream of the clutch 46. Another PTO 31 is shown attached on or near the flywheel 40 of the engine 10, yet it is still upstream of the clutch 46. PTOs 30, 31 can operate regardless of the engagement of the clutch. A PTO 32 that is mounted downstream of the clutch 46 is also shown in FIG. 1. This PTO 32 is dependent upon engagement of the clutch 46 to receive power. This disclosure relates generally to PTOs that are located upstream of the clutch 46 and therefore directly influenced by engine speed.

According to the present invention, the maximum allowable operating speed of the PTO is used to limit engine speed to ensure that the PTO does not exceed its maximum speed limit. This is important because if the PTO exceeds its maximum allowable speed, equipment failure can result. The information about the drive speed allowed for the PTO can be transmitted over a communication port. As described above, several methods are contemplated for this type of communication and no specific type of communication is required by the present invention.

In one embodiment of the invention, the information regarding the speed limit of the PTO can be pre-stored in memory associated with the transmission control system 52 or other control unit(s). Generally, the transmission control unit 52 uses the speed limit of the PTO to select an appropriate gear change in order to ensure that the PTO does not exceed its maximum allowable speed. It should be appreciated that the PTO revolutional speed may or may not be the same as the revolutional speed of the engine. If a gear reduction is used for the PTO, the information that should be transmitted back to the transmission unit 52 is the maximum allowable engine speed which takes this reduction into account. So the above information that is communicated to the transmission control unit 52 is the appropriate engine speed given any gear reduction to the PTO. The above is given as an example of compensating for the known values of speed. Alternatively, the speed limitation can be specified based upon the speed of the attachment point. Other methods of calculating the appropriate engine speed limitation are considered within the scope of this disclosure as well.

To ensure that the transmission control unit 52 only uses the specified engine speed limit, a signal is sent to the transmission control unit 52 informing the transmission control unit 52 that the PTO is engaged, otherwise no limit will be placed on the engine based upon the maximum PTO speed.

In another embodiment of the invention, the method of selecting a gear ratio is determined by the maximum allowable operating speed of the PTO. The engagement of the PTO is a parameter also used to determine whether such a limitation on the gear ratio selection should be implemented. The PTO speed can vary from the engine speed by a known ratio such as one that is driven from a gear reduction drive.

Figure 2:
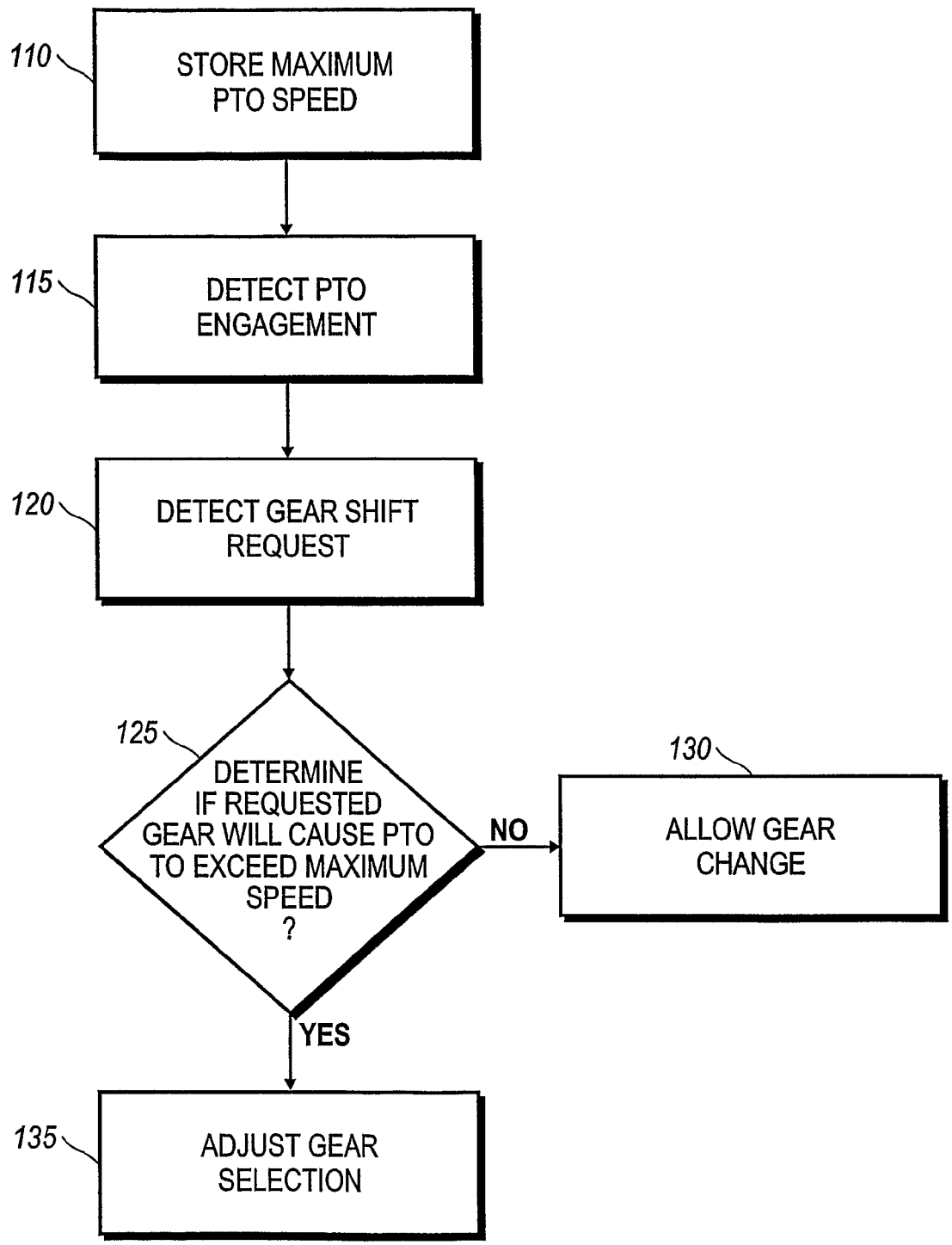
FIG. 2 is a flow chart illustrating an exemplarily method for adjusting gear selection of automatic mechanical transmission to prevent a PTO from exceeding its maximum allowable speed.

A method for limiting the speed of a prime mover or engine by controlling the gear selection of the automatic mechanical transmission is generally illustrated in FIG. 2. As can be seen, the maximum PTO speed is stored in a control unit (block 110). The controller can be one of a transmission control unit 52, an engine control unit 50, and a vehicle control unit. The control unit then detects that a PTO has been engaged (block 115). If a gear shift request is detected (block 120), a determination of whether the requested gear will cause the PTO to exceed the maximum speed is made (block 125). The gear shift request can be either an upshift or a downshift. If a determination is made that the maximum speed of the PTO will be exceeded, then an adjustment to the gear selection is made in order to keep the PTO speed within the allowable range (block 135). Otherwise, the gear selection is allowed to proceed and change to the previously selected gear (block 130). Additionally, by limiting the engine speed to that of the maximum PTO speed it is further possible to prevent over-speeding of the engine 10 as well.

Figure 3:
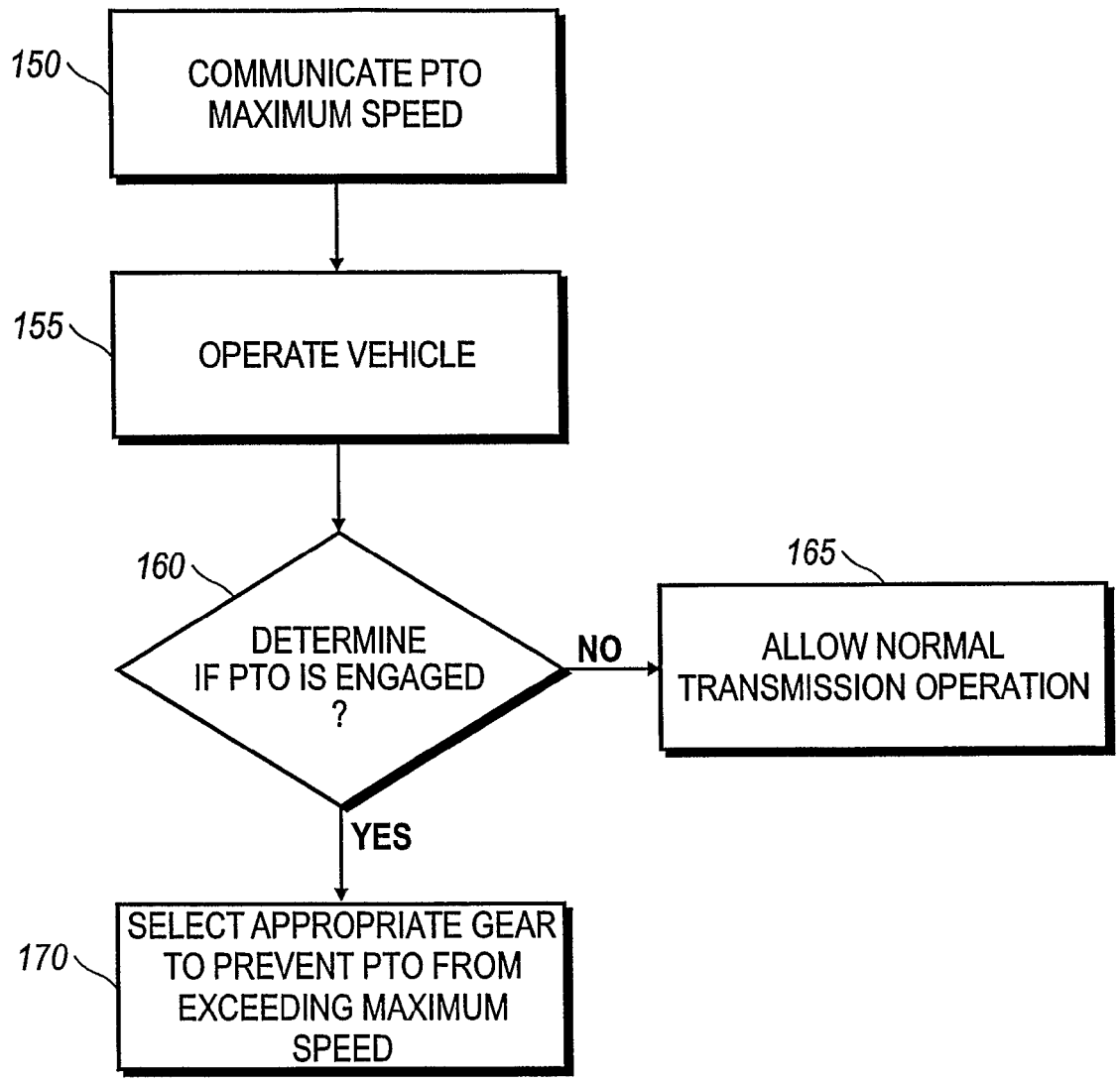
FIG. 3 is a flow chart illustrating another exemplarily method for preventing the PTO from exceeding its maximum allowable speed.

Another method for selecting the appropriate gear to prevent the PTO from exceeding its maximum speed is illustrated in FIG. 3. If the maximum speed of the PTO is known and stored, this value can be communicated to the appropriate controller (block 150). The controller can be one of those previously described and preferably is the controller used in making gear selection. While the vehicle is operated in a normal fashion (block 155), a determination is made whether the PTO is engaged (block 160). If the PTO is not engaged, then the transmission 20 and gear selection is allowed to take place under the normal programming routines (block 165). However, if a PTO is engaged, then the gear selection must select an appropriate gear to prevent the PTO from exceeding its maximum speed.

While preferred and alternative embodiments of the presently disclosed solutions are shown and described herein, such embodiments are provided for example purposes only. Numerous variations, changes and substitutions will occur to those skilled in the art without departing from the bounds of the disclosure. Accordingly, it is intended that the patent protection claimed be limited only by the spirit and scope of the patent claims, themselves.

What is claimed is:

1. A method for limiting a speed of a prime mover in a heavy vehicle equipped with an automatic mechanical transmission in order to avoid over-speeding an associated power take off unit (PTO), the method comprising:
adjusting operation of the automatic mechanical transmission to select a gear ratio so that the selected gear ratio prevents a presently engaged PTO from exceeding a maximum allowable operating speed limit thereof, comprising
determining whether the PTO is engaged,
detecting a gear ratio selection request, and
determining whether the detected gear ratio selection request will cause the PTO to exceed the maximum allowable operating speed limit and,
if the detected gear ratio selection request will cause the PTO to exceed the maximum allowable operating speed limit, adjusting the gear ratio selection, and
if the detected gear ratio selection request will not cause the PTO to exceed the maximum allowable operating speed limit, allowing the gear ratio selection.

2. The method for limiting a speed of a prime mover as recited in claim 1, wherein the adjusting operation of the automatic mechanical transmission is one of an upshift or a downshift.

3. The method for limiting a speed of a prime mover as recited in claim 1, comprising storing the maximum allowable operating speed in a control unit.

4. The method for limiting a speed of a prime mover as recited in claim 3, wherein the control unit is one of a transmission control unit, an engine control unit, and a vehicle control unit.

5. The method for limiting a speed of a prime mover as recited in claim 4, comprising transmitting the stored maximum allowable operating speed to a control unit responsible for gear selection.

6. The method for limiting a speed of a prime mover as recited in claim 5, wherein the control unit responsible for gear selection is a transmission control unit.

7. The method for limiting a speed of a prime mover as recited in claim 6, wherein the transmission control unit comprises a gear selection unit and a gear shifting unit.

8. A method for protecting a power take off device (PTO), comprising:
communicating a PTO maximum allowable speed to an automatic mechanical transmission control unit;
verifying that the PTO device is engaged; and
selecting a gear ratio using the transmission control unit to affect an engine speed that assures that the maximum allowable speed of the PTO device is not exceeded comprising,
determining whether the gear ratio selection will cause the PTO to exceed the maximum allowable operating speed limit and,
if the selected gear ratio selection will cause the PTO to exceed the maximum allowable operating speed limit, adjusting the gear ratio selection, and
if the selected gear ratio selection will not cause the PTO to exceed the maximum allowable operating speed limit, allowing the gear ratio selection.

9. A method for adapting engine speed when the presence of a power take off device (PTO) is detected, the method comprising:
adjusting operation of a transmission to select a gear ratio wherein the selected gear ratio prevents the engine speed from producing a PTO speed greater than a maximum allowable operating speed limit for the PTO, comprising
determining whether the PTO is engaged,
detecting a gear ratio selection, and
determining whether the detected gear ratio selection will cause the PTO to exceed the maximum allowable operating speed limit and
if the detected gear ratio selection will cause the PTO to exceed the maximum allowable operating speed limit, adjusting the gear ratio selection, and
if the detected gear ratio selection will not cause the PTO to exceed the maximum allowable operating speed limit, allowing the gear ratio selection.

10. A method for adapting engine speed according to a presence of a power take off device (PTO), comprising:
adjusting operation of a transmission to select a gear ratio wherein the selected gear ratio controls the engine speed such that a power take off speed will not exceed a maximum allowable power take off speed for the PTO, comprising
determining whether the PTO is engaged,
detecting a gear ratio selection, and
determining whether the detected gear ratio selection will cause the PTO to exceed the maximum allowable operating speed limit and
if the detected gear ratio selection will cause the PTO to exceed the maximum allowable operating speed limit, adjusting the gear ratio selection, and
if the detected gear ratio selection will not cause the PTO to exceed the maximum allowable operating speed limit, allowing the gear ratio selection.

* * * * *